United States Patent [19]

Kishida et al.

[11] Patent Number: 4,730,024

[45] Date of Patent: Mar. 8, 1988

[54] LUBRICANT FOR THERMOPLASTIC RESINS AND THERMOPLASTIC RESIN COMPOSITION COMPRISING SAID LUBRICANT

[75] Inventors: Kazuo Kishida, Hiroshima; Kazuo Ueda, Kawasaki; Masahiro Kaneda, Ootake, all of Japan

[73] Assignee: Mitsubishi Rayon Co., Ltd., Tokyo, Japan

[21] Appl. No.: 860,256

[22] Filed: May 6, 1986

[30] Foreign Application Priority Data

May 10, 1985 [JP] Japan ................................ 60-99355

[51] Int. Cl.⁴ .................. C08F 265/04; C08F 265/06; C08F 255/00; C08L 51/06
[52] U.S. Cl. ........................... 525/80; 525/71; 525/85; 525/309; 525/902
[58] Field of Search ............... 525/80, 309, 902, 71, 525/302, 370, 84, 85

[56] References Cited

U.S. PATENT DOCUMENTS

| | | | |
|---|---|---|---|
| 3,859,384 | 1/1975 | Carty et al. | 525/902 |
| 3,925,510 | 12/1975 | Ide et al. | 525/902 |
| 3,971,835 | 7/1976 | Myers et al. | 525/85 |
| 4,302,845 | 12/1982 | Kamata et al. | 525/902 |
| 4,426,493 | 1/1984 | Falk | 525/309 |
| 4,521,568 | 6/1985 | Mori et al. | 525/309 |

FOREIGN PATENT DOCUMENTS

| | | |
|---|---|---|
| 50-23067 | 8/1975 | Japan . |
| 52-781 | 1/1977 | Japan . |
| 52-3668 | 1/1977 | Japan . |

*Primary Examiner*—Allan M. Lieberman
*Attorney, Agent, or Firm*—Oblon, Fisher, Spivak, McClelland & Maier

[57] ABSTRACT

Disclosed is a lubricant for thermoplastic resins, which is prepared by (A) polymerizing 60–100 wt. % of an aromatic vinyl monomer and 0–40 wt. % of other vinyl monomer copolymerizable therewith to form a polymer, (B) polymerizing 30–70 wt. parts of a monomer or monomer mixture comprising 50–100 wt. % of an acrylic acid ester and 0–50 wt. % of other vinyl monomer or monomers copolymerizable therewith in the presence of 10–60 wt. parts of said polymer so that when said monomer or monomer mixture is singly polymerized, the reduced viscosity of the resulting polymer is lower than 1.0, to obtain a polymer, and (C) polymerizing 5–30 wt. parts of a methacrylic acid ester in the presence of the two-stage polymer obtained at the steps (A) and (B) so that the total amount of the components (A), (B) and (C) is 100 wt. parts. A thermoplastic resin composition comprising this lubricant has an excellent mold release characteristics and lubricating property at the molding step, and a molded article prepared from the composition has a good gloss.

8 Claims, No Drawings

LUBRICANT FOR THERMOPLASTIC RESINS AND THERMOPLASTIC RESIN COMPOSITION COMPRISING SAID LUBRICANT

BACKGROUND OF THE INVENTION

1. Field of the Invention

The present invention relates to a lubricant for thermoplastic resins, and a thermoplastic resin composition comprising the lubricant. This thermoplastic resin composition has an excellent mold release characteristics at the molding step and can give a good gloss to a molded article.

2. Description of the Related Art

Since thermoplastic resins have good physical and chemical characteristics, they are widely used as films, sheets, wall materials, interior and exterior materials of automobiles, household electric appliances and the like. However, thermoplastic resins such as a vinyl chloride polymer resin, an ABS resin, a styrene polymer resin, and an acrylic resin have problems such that various processability characteristics are poor. As means for eliminating this defect, there has been adopted a method in which a thermal stabilizer, a processing aid such as a copolymer composed mainly of methyl methacrylate, a plasticizer, a mold release agent, a lubricant and the like are incorporated. However, this method cannot become a general solution of the problem.

Accordingly, various research and development has been carried out to solve the above problem, and vinyl chloride polymer resin compositions as disclosed in Japanese Examined Patent Publications Nos. 52-781, 52-3668 and 50-23067 have been proposed.

In the above-mentioned compositions, the inherent transparency of a vinyl chloride polymer resin is retained, the moldability such as drawdown, the flowability at the molding step, and the elongation at a high temperature are improved, and lubricating properties such as releasing from the roll surface at the calendering step can be maintained for a long time. However, in order to improve the productivity and quality, and from the energy-saving viewpoint, it is desirable to develop a processing aid capable of giving a durable lubricating property to a vinyl chloride polymer resin at the processing step, and this desire is not sufficiently satisfied in the above-mentioned compositions. Moreover, an increase of substances adhering to molds (plateout) is observed under some molding and processing conditions. Accordingly, the above-mentioned compositions fail to sufficiently satisfy commercial requirements.

SUMMARY OF THE INVENTION

A primary object of the present invention is to solve the above-mentioned problem. Namely, the present invention is to provide a lubricant for thermoplastic resins, characterized in that the thermoplastic resin composition containing this lubricant has excellent mold release characteristics at the molding step and gives good surface characteristics to a molded article.

In accordance with the present invention, there is provided a lubricant for thermoplastic resins, which is prepared by (A) polymerizing 60 to 100% by weight of an aromatic vinyl monomer and 0 to 40% by weight of other vinyl monomer or monomers copolymerizable therewith to form a polymer, (B) polymerizing 30 to 70 parts by weight of a monomer or monomer mixture comprising 50 to 100% by weight of an acrylic acid ester and 0 to 50% by weight of other vinyl monomer or monomers copolymerizable therewith in the presence of 10 to 60 parts by weight of said polymer wherein when said monomer or monomer mixture is polymerized alone, the reduced viscosity $\eta sp/C$ of the resulting polymer is lower than 1.0 as measured at 25° C. with respect to a solution of 0.1 g of the polymer in 100 ml of chloroform, to obtain a polymer, and (C) polymerizing 5 to 30 parts by weight of a methacrylic acid ester in the presence of the two-stage polymer obtained at the steps (A) and (B) so that the total amount of the components (A), (B) and (C) is 100 parts by weight.

Furthermore, in accordance with the present invention, there is provided a thermoplastic resin composition comprising 100 parts by weight of a thermoplastic resin and 0.05 to 10 parts by weight of the above-mentioned lubricant.

DESCRIPTION OF THE PREFERRED EMBODIMENTS

As the thermoplastic resin for which the lubricant of the present invention is used, there can be mentioned a vinyl chloride polymer resin (such as a polyvinyl chloride resin or a chlorinated vinyl chloride polymer resin), an ABS resin, a styrene polymer resin, a methacrylate polymer resin, and a polyethylene resin.

The lubricant of the present invention is a polymer of a three-layer structure, which is obtained by polymerizing the above-mentioned monomer components (A), (B) and (C) in sequence. A styrene polymer and a methacrylate polymer are arranged on the inner and outer sides, respectively, of the polymer of the component (B) imparting a lubricating property to a thermoplastic resin, and the lubricant has a so-called sandwiched structure in which the kneading compatibility with a thermoplastic resin is improved.

The component (A) is an aromatic vinyl homopolymer or an aromatic vinyl copolymer comprising up to 40% by weight of other vinyl monomer or monomers copolymerizable with an aromatic vinyl monomer. As the aromatic vinyl monomer, there may be used styrene, α-methylstyrene and the like singly or in combination. The other vinyl monomer to be copolymerized with the aromatic vinyl monomer is not particularly critical, and an appropriate monomer is used according to the intended object. For example, there can be used vinyl cyanide compounds, vinyl esters, acrylic acid esters and methacrylic acid esters.

These other monomers may be used singly or in the form of mixtures of two or more thereof. If the amount of the other monomer exceeds 40% by weight, the transparency is degraded and the long-period durability of the lubricating property are drastically reduced. For the component (A), polyfunctional monomers such as divinylbenzene and allyl methacrylate may be used in addition to the above-mentioned monomers. Furthermore, a chain transfer agent such as n-octylmercaptan may be used. The amount of the polyfunctional monomer or chain transfer agent used is preferably up to 2.0% by weight.

The amount of the component (A) incorporated in the lubricant of the present invention is 10 to 60 parts by weight, preferably 20 to 50 parts by weight, per 100 parts by weight of the sum of the components (A), (B) and (C). If the amount of the component (A) is larger than 60 parts by weight, the lubricating property is degraded, and if the amount of the component (A) is smaller than 10 parts by weight, the processability is reduced and the durability of the lubricating property is degraded.

The component (B) is a homopolymer of an acrylic acid ester or a copolymer of an acrylic acid ester with up to 50% by weight of other vinyl monomer copolymerizable therewith. As the acrylic acid ester, there can be mentioned, for example, ethyl acrylate, butyl acrylate, benzyl acrylate, 2-ethylhexyl acrylate, cyclohexyl acrylate and phenyl acrylate. As the other copolymerizable monomer, there can be mentioned methacrylic acid esters, other acrylic acid esters, and aromatic vinyl monomers such as styrene and α-methylstyrene. If the amount of the other copolymerizable vinyl monomer exceeds 50% by weight, the intended long-period durability of the lubricating property is difficult to obtain. In order to impart a good lubricating effect to a thermoplastic resin, it is preferred that a monomer or monomer mixture giving a polymer having a low glass transition temperature be used as the component (B). In order to further enhance the lubricating effect, it is preferred that the molecular weight be reduced by using a chain transfer agent such as n-octylmercaptan. It is indispensable that the polymerization should be carried out so that when the component (B) is polymerized alone, the reduced viscosity of the obtained polymer is lower than 1.0 as measured at 25° C. with respect to a solution of 0.1 g of the polymer in 100 ml of chloroform. More specifically, the polymerization is carried out by adjusting the amount of the chain transfer agent or catalyst used and the polymerization temperature.

The amount of the component (B) incorporated in the lubricant is 30 to 70 parts by weight, preferably 35 to 70 parts by weight, per 100 parts by weight of the sum of the components (A), (B) and (C). If the amount of the component (B) is smaller than 30 parts by weight, the lubricating property is degraded, and if the amount of the component (B) is larger than 70 parts by weight, the surface characteristics such as gloss are degraded.

The component (C) is a polymer of a methacrylic acid ester. As the methacrylic acid ester, there can be mentioned methyl methacrylate, ethyl methacrylate and butyl methacrylate, and methyl methacrylate is preferred. The reason is that methyl methacrylate is effective for improving the mixing-kneadability with a thermoplastic resin and giving a good secondary processability to the thermoplastic resin.

The amount of the component (C) incorporated in the lubricant is 5 to 30 parts by weight, preferably 5 to 25 parts by weight, per 100 parts by weight of the sum of the components (A), (B) and (C). If the amount of the component (C) incorporated is smaller than 5 parts by weight, sufficient processability cannot be given to a thermoplatic resin, and secondary aggregation is easily caused at the steps of coagulating, dehydrating, and drying the polymer after polymerization of the component (C) and the productivity is degraded. If the amount incorporated of the component (C) is larger than 30 parts by weight, the long-term durability of the lubricating property is lost.

As pointed out hereinbefore, the lubricant of the present invention is a polymer having a three-layer structure. This structure can be easily obtained by adding and polymerizing the monomers of the components (A), (B) and (C) in sequence. As the polymerization method, there can be mentioned emulsion polymerization, suspension polymerization and bulk polymerization, and emulsion polymerization is especially preferred. In the emulsion polymerization method, in order to form a three-layer structure, it is preferred that at the second and subsequent polymerization stages, the polymerization be advanced without addition of a fresh emulsifier, and formation of homopolymers of the components (B) and (C) be substantially controlled. Any known emulsifier may be used. For example, an ordinary surface active agent may be used. If the pH value of the polymerization mixture is turned to the alkaline side according to the kind of the emulsifier used, an appropriate pH adjusting agent may be used so as to prevent hydrolysis. As the pH adjusting agent, there may be used boric acid-potassium chloride-sodium hydroxide, potassium dihydrogenphosphate-disodium hydrogenphosphate, boric acid-potassium chloride-sodium carbonate, boric acid-sodium carbonate, potassium hydrogencitrate-citric acid, potassium dihydrogenphosphate-borax, and disodium hydrogenphosphatecitric acid. Any water-soluble and oil-soluble single polymerization initiator and redox polymerization initiator may be used. For example, an ordinary water-soluble inorganic initiator such as a persulfate is singly used, or a redox type initiator comprising a persulfate or the like and a sulfite, a hydrogensulfite or a thiosulfate is used. Moreover, a redox type initiator such as organic hydroperoxide-sodium formaldehydesulfoxylate, or an azo compound may be used.

As pointed out hereinbefore, in order to impart an excellent durability of the lubricating property to the lubricant of the present invention, it is important that the molecular weight of the polymer of the component (B) should be maintained at a very low level, that is, the reduced viscosity ($\eta sp/C$) should be lower than 1.0, preferably 0.3 to 0.8. If the reduced viscosity is not lower than 1.0, the lubricating effect is degraded.

Even if the reduced viscosity of the component (C) is not particularly controlled, the effects of the present invention are sufficiently attained. The reduced viscosity of the polymer may be adjusted according to customary procedures depending on such factors as the kind of chain transfer agent and the polymerization temperature.

The thermoplastic resin composition of the present invention comprises 100 parts by weight of a thermoplastic resin and 0.05 to 10 parts by weight of the above-mentioned lubricant. Mixing of the lubricant with the thermoplastic resin may be performed according to customary methods. For example, there may be adopted a method in which powders or pellets of the lubricant and thermoplastic resin are mixed by a melt extruder or a mixing roll, and a method in which a dispersion of the thermoplastic resin obtained by suspension polymerization or emulsion polymerization is mixed with a polymer latex of the lubricant obtained according to the present invention, and the mixture is subjected to acid precipitation or salt precipitation.

According to need, various additives may be added to the thermoplastic resin composition of the present invention. For example, there may be used stabilizers such as organic tin compounds, metal soaps of the lead, barium and zinc types an epoxy compounds, lubricants such as stearic acid, ester wax, paraffin wax and stearyl alcohol, plasticizers such as phthalic acid esters, phosphoric acid esters, fatty acid esters and epoxy compounds, impact resistance improvers such as MBS and ABS, colorants such as carbon black and titanium oxide, fillers such as calcium carbonate and asbestos, inorganic blowing agents such as ammonia carbonate and sodium bicarbonate, and organic blowing agents such as nitro type blowing agents, sulfohydrazide blowing agents, and azo type blowing agents.

The present invention will now be described in detail with reference to the following examples and comparative examples. In these examples, all of "parts" are by weight.

Examples 1 through 3

A reaction vessel equipped with a stirrer and a reflux cooler was charged with 280 parts of deionized water, 1.5 parts of sodium dioctylsulfosuccinate, 2.0 parts of ammonium persulfate, 0.005 part of n-octylmercaptan and a component (A) shown in Table 1, and the inner atmosphere was replaced by nitrogen. The temperature in the reaction vessel was elevated to 65° C. with stirring and the mixture was stirred at this temperature for 2 hours. Then, a mixture of 40 parts of n-butyl acrylate as the component (B) and 0.5 part of n-octylmercaptan was dropped to the reaction mixture over a period of 1 hour, and after completion of the dropwise addition, the mixture was stirred for 2 hours. Then, a mixture of a component (C) shown in Table 1 and 0.002 part of n-octylmercaptan was added to the reaction mixture over a period of 30 minutes, and the resulting mixture was stirred for 2 hours to complete the polymerization. The obtained emulsion was cooled and subjected to salt precipitation using aluminum chloride, followed by filtration, washing and drying, whereby a polymer was obtained.

An appropriate amount of the obtained polymer was mixed with 100 parts of a polyvinyl chloride resin (having an average polymerization degree of 700), 2.0 parts of dibutyltin mercaptide, 1.0 part of an epoxy type assistant, 0.5 part of dibutyltin maleate, and 0.3 part of a lubricant by a Henschel mixer to obtain a polyvinyl chloride resin composition.

The monomers of the components (A) through (C) are collectively shown in Table 1.

In order to demonstrate prominent effects of the present invention, the following evaluation tests were carried out (the same evaluation tests were conducted in the subsequent examples and comparative examples). The obtained results are shown in Table 1.

1 Roll Lubricating Property

Two 6-inch rolls maintained at kneading temperatures of 200° C. and 195° C., respectively, were used with a roll gap of 1 mm, and 100 g of a sample was kneaded for 5 minutes and the release characteristics from the roll surface was evaluated. The evaluation was made according to the 5-point method, in which "5" indicates the highest release characteristics and "1" indicates the lowest release characteristics. A value closer to 5 shows a better lubricating property. Note, "phr" in Table 1 represents the amount (parts) per 100 parts of the thermoplastic resin (polyvinyl chloride resin).

2. Stickiness

According to the same recipe as used in the roll lubricating property test, 100 g of a sample [1.0 phr of the polymer was added to the thermoplastic resin (polyvinyl chloride resin)]and was kneaded by rolls maintained at kneading temperatures of 205° C. and 200° C., respectively, with a roll gap of 1 mm, and kneading was conducted until the sheet did not release from but kept sticking to the roll surface, and this kneading time was measured. The longer times indicate a better durability of the lubricating property at a high temperature.

3. Ungelled Substance and Plateout

According to the same recipe as used in the roll lubricating property test, a sample was prepared by adding 2.0 phr of the polymer to the thermoplastic resin (polyvinyl chloride resin) and was kneaded by rolls maintained at kneading temperatures of 180° C. and 175° C., respectively, for 5 minutes to obtain a sheet having a thickness of 0.3 mm. The presence of an ungelled substance was checked, and occurrence of plateout on the roll surface was checked based on the presence or absence of a substance adhering to the roll surface.

4. Transparency

According to the same recipe as used in the roll lubricating property test, a sample was prepared by adding 0.5 phr of the polymer to the thermoplastic resin (polyvinyl chloride resin) and kneaded for 5 minutes, and the kneaded sample was compressed at 185° C. to form a press plate having a thickness of 2 mm. The transparency was determined according to the method of JIS 6714 using an integration ball type haze meter.

5. Gloss

Under the same temperature conditions as adopted in the roll lubricating property test, 0.5 phr of the polymer was kneaded with the polyvinyl chloride resin or another resin for 5 minutes, and the kneaded sample was compressed at 185° C. to form a press plate having a thickness of 2 mm. The gloss was evaluated by visual assessment according to the following scale.

A: very good
B: good
C: bad

COMPARATIVE EXAMPLE 1

As shown in Table 1, the component (B) used in Example 1 was first polymerized, and 50 parts of methyl methacrylate as the component (C) and 0.002 part of n-octylmercaptan were added and polymerized. Then, a polymer [two-stage polymer free of the component (A)] was obtained in the same manner as described in Example 1.

An appropriate amount of the obtained polymer was mixed with 100 parts of a polyvinyl chloride resin (having an average degree of 700), 2.0 parts of dibutyltin mercaptide, 1.0 part of an epoxy type assistant, 0.5 part of dibutyltin maleate, and 0.3 part of a lubricant by a Henschel mixer. The evaluation tests of the resulting polyvinyl chloride resin composition were carried out in the same manner as described in Example 1. The obtained results are shown in Table 1.

COMPARATIVE EXAMPLE 2

The same reaction vessel as used in Example 1 was charged with a mixture comprising 280 parts of deionized water, 1.5 parts of sodium dioctylsulfosuccinate, 2.0 parts of ammonium persulfate, 50 parts of styrene as the component (A) and 0.005 part of n-octylmercaptan and the inner atmosphere was replaced by nitrogen. The temperature in the reaction vessel was elevated to 65° C. with stirring, and the mixture was heated with stirring for 2 hours. Under the same conditions as described in Example 1, 50 parts of butyl acrylate as the component (B) was added and reacted to obtain a polymer [two-stage polymer free of the component (C)].

An appropriate amount of the obtained polymer was kneaded with a mixture comprising 100 parts of a polyvinyl chloride resin (having an average molecular weight of 700), 2.0 parts of dibutyltin mercaptide, 1.0 part of an epoxy type assistant, 0.5 part of dibutyltin maleate, and 0.3 part of a lubricant by a Henschel mixer to obtain a polyvinyl chloride resin composition. The results of the evaluation tests are shown in Table 1.

COMPARATIVE EXAMPLE 3

A polyvinyl chloride resin composition was prepared in the same manner as described in Comparative Example 1 except that the polymer of the present invention was not used at all. The results of the evaluation tests are shown in Table 1.

EXAMPLES 4 through 8

Polyvinyl chloride resin compositions were prepared in the same manner as described in Examples 1 through 3 except that the monomers of the components (A) through (C) were changed as shown in Table 2. The results of the evaluation tests are shown in Table 2.

COMPARATIVE EXAMPLES 4 through 6

Polyvinyl chloride resin compositions were prepared in the same manner as described in Examples 1 through 3 except that the monomers of the components (A) through (C) were changed as shown in Table 2. The results of the evaluation tests are shown in Table 2.

TABLE 1

| | Composition (parts) of Polymer | | | | | | | |
|---|---|---|---|---|---|---|---|---|
| | Component (A) | | Component (B) | | Component (C) | | Ungelled | |
| | St | n-osh/$\eta$sp/C | BA | n-osh/$\eta$sp/C | MMA | n-osh/$\eta$sp/C | Substance | Plateout |
| Example 1 | 50 | 0.005/5.0 | 40 | 0.5/0.6 | 10 | 0.002/5.0 | slight | none |
| Example 2 | 45 | 0.005/5.0 | 40 | 0.5/0.6 | 15 | 0.002/5.0 | slight | none |
| Example 3 | 40 | 0.005/5.0 | 40 | 0.5/0.6 | 20 | 0.002/5.0 | slight | none |
| Comparative Example 1 | 0 | — | 50 | 0.5/0.6 | 50 | 0.002/5.0 | considerable | none |
| Comparative Example 2 | 50 | 0.005/5.0 | 50 | 0.5/0.6 | 0 | — | slight | none |
| Comparative Example 3 | — | — | — | — | — | — | none | slight |

| | Processing Characteristics | | | | | | |
|---|---|---|---|---|---|---|---|
| | Stickiness (minutes, 1.0 phr) | Roll Lubricating Property | | | Transparency | | Gloss of Molded Article |
| | | 0.3 phr | 0.5 phr | 1.0 phr | Total Luminous Transmittance (%) | Haze (%) | |
| Example 1 | 30 | 2.8 | 3.3 | 3.6 | 82 | 7.0 | A |
| Example 2 | 30 | 3.0 | 3.6 | 3.8 | 82 | 6.8 | A |
| Example 3 | 30 | 3.2 | 3.8 | 4.0 | 82 | 6.0 | A |
| Comparative Example 1 | 5 | — | 1.0 | 2.0 | 70 | 29.0 | B |
| Comparative Example 2 | 15 | — | — | 1.5 | 78 | 16.0 | C |
| Comparative Example 3 | 3 | — | — | — | 81 | 8.5 | B |

Note
St: styrene
BA: n-butyl acrylate
MMA: methyl methacrylate
n-osh: n-octylmercaptan

TABLE 2

| | Composition (parts) of Polymer | | | | | | | |
|---|---|---|---|---|---|---|---|---|
| | Component (A) | | Component (B) | | Component (C) | | Ungelled | |
| | St | n-osh/$\eta$sp/C | EA | n-osh/$\eta$sp/C | MMA | n-osh/$\eta$sp/C | Substance | Plateout |
| Example 4 | 40 | 0.05/1.0 | 40 | 0.5/0.6 | 20 | 0.02/2.0 | none | none |
| Example 5 | 40 | 0.005/5.0 | 50 | 0.5/0.6 | 10 | 0.002/5.0 | none | none |
| Example 6 | 30 | 0.005/5.0 | 60 | 0.5/0.6 | 10 | 0.002/5.0 | none | none |
| Comparative Example 4 | 40 | 0.005/5.0 | 40 | 0.02/2.0 | 20 | 0.002/5.0 | slight | none |
| Comparative Example 5 | 70 | 0.005/5.0 | 10 | 0.5/0.6 | 20 | 0.002/5.0 | considerable | considerable |
| Comparative Example 6 | 40 | 0.05/1.0 | 40 | 0.5/0.6 | St 20 | 0.02/2.0 | slight | slight |

| | Processing Characteristics | | | | | | |
|---|---|---|---|---|---|---|---|
| | Stickiness (minutes, 1.0 phr) | Roll Lubricating Property | | | Transparency | | Gloss of Molded Article |
| | | 0.3 phr | 0.5 phr | 1.0 phr | Total Luminous Transmittance (%) | Haze (%) | |
| Example 4 | 30 | 2.6 | 3.0 | 3.4 | 84 | 7.0 | A |
| Example 5 | 30 | 2.7 | 3.0 | 3.5 | 81 | 10.0 | A |
| Example 6 | 30 | 2.9 | 3.2 | 3.5 | 80 | 11.0 | A |
| Comparative Example 4 | 7 | — | 1.0 | 1.5 | 82 | 7.6 | A |

TABLE 2-continued

|  |  |  |  |  |  |  |  |
|---|---|---|---|---|---|---|---|
| Comparative Example 5 | 2 | — | — | 1.0 | 83 | 7.0 | A |
| Comparative Example 6 | 15 | — | 1.0 | 1.5 | 80 | 7.2 | C |

Note
EA: ethyl acrylate

EXAMPLES 7 through 9

Polyvinyl chloride resin compositions were prepared in the same manner as described in Examples 1 through 3 except that the monomers of the components (A) through (C) were changed as shown in Table 3. The results of the evaluation tests are shown in Table 3.

COMPARATIVE EXAMPLES 7 and 8

Polyvinyl chloride resin compositions were prepared in the same manner as described in Examples 1 through 3 except that the monomers of the components (A) through (C) were changed as shown in Table 3. The results of the evaluation tests are shown in Table 3.

COMPARATIVE EXAMPLES 9 through 11

Processing characteristics of an ABS resin free of the lubricant (Comparative Example 9), a resin composition formed by incorporating the polymer obtained in Comparative Example 1 in the amount adopted in the evaluation tests into an ABS resin (Comparative Example 10), a resin composition formed by incorporating the polymer of Comparative Example 4 in the amount adopted in the evaluation tests into an ABS resin (Comparative Example 11), and a styrene polymer resin free of the lubricant (Comparative Example 12) were examined. The obtained results are shown in Table 4.

TABLE 3

| | Composition (parts) of Polymer | | | | | | | |
|---|---|---|---|---|---|---|---|---|
| | Component (A) | | Component (B) | | Component (C) | | Ungelled | |
| | St/MMA | n-osh/$\eta$sp/C | BA/BMA | n-osh/$\eta$sp/C | MMA | n-osh/$\eta$sp/C | Substance | Plateout |
| Example 7 | 30/10 | 0.005/5.0 | 40/0 | 0.5/0.6 | 20 | 0.002/5.0 | none | none |
| Example 8 | 30/10 | 0.005/5.0 | 30/10 | 0.5/0.6 | 20 | 0.002/5.0 | none | none |
| Example 9 | 40/0 | 0.005/5.0 | 30/10 | 0.5/0.6 | 20 | 0.002/5.0 | none | none |
| Comparative Example 7 | St/BMA 10/30 | 0.005/4.9 | 40/0 | 0.5/0.6 | 20 | 0.002/5.0 | none | none |
| Comparative Example 8 | 40/0 | 0.005/5.0 | BA/MMA 15/35 | 0.5/0.6 | 20 | 0.002/5.0 | none | none |

| | Processing Characteristics | | | | | | |
|---|---|---|---|---|---|---|---|
| | Stickiness (minutes, 1.0 phr) | Roll Lubricating Property | | | Transparency | | Gloss of Molded Article |
| | | 0.3 phr | 0.5 phr | 1.0 phr | Total Luminous Transmittance (%) | Haze (%) | |
| Example 7 | 30 | 2.8 | 3.1 | 3.5 | 82 | 7.2 | A |
| Example 8 | 30 | 2.8 | 3.1 | 3.5 | 83 | 8.0 | A |
| Example 9 | 30 | 2.8 | 3.1 | 3.6 | 82 | 8.0 | A |
| Comparative Example 7 | 20 | — | — | 1.0 | 1.5 | 76 | 15.0 | B |
| Comparative Example 8 | 5 | — | — | 1.2 | 83 | 7.0 | A |

Note
BMA: butyl methacrylate

EXAMPLES 10 through 12

Resin compositions were prepared by incorporating the polymer prepared in Example 1 in the amount adopted in the evaluation tests into an ABS resin, a styrene polymer resin or a chlorinated vinyl chlorine polymer resin. The results of the evaluation tests are shown in Table 4.

The ABS resin used in Example 10 and Comparative Examples 9 through 11 was Diapet ®3001 (supplied by Mitsubishi Rayon Co., Ltd.), the styrene polymer resin used in Example 11 and Comparative Example 12 was a polystyrene resin ("NF-20", trade name, supplied by Idemitsu Petrochemical), and the chlorinated vinyl chloride polymer resin used in Example 12 was "NIKATEMP T-742", trade name, supplied by Nippon Carbide.

TABLE 4

| | | | Processing Characteristics | | | | | | |
|---|---|---|---|---|---|---|---|---|---|
| | Kind of Resin | Kind of Polymer | Ungelled Substance | Plateout | Stickiness (minutes, 1.0 phr) | Roll Lubricating Property | | | Gloss of Molded Article |
| | | | | | | 0.3 phr | 0.5 phr | 1.0 phr | |
| Example 1 | polyvinyl chloride resin | polymer prepared in Example 1 | slight | none | 30 | 2.8 | 3.3 | 3.6 | A |
| Example 10 | ABS resin | polymer prepared in Example 1 | slight | none | 30 | 2.9 | 3.4 | 3.7 | A |
| Example 11 | styrene polymer resin | polymer prepared in Example 1 | slight | none | 25 | 1.0 | 1.8 | 2.5 | A |
| Example 12 | chlorinated polyvinyl chloride resin | polymer prepared in Example 1 | slight | slight | 20 | 0.8 | 1.6 | 2.0 | B |
| Comparative | ABS resin | (not added) | slight | slight | 5 | — | 0.5 | 1.2 | A-B |

TABLE 4-continued

| | Kind of Resin | Kind of Polymer | Processing Characteristics | | | | | | Gloss of Molded Article |
|---|---|---|---|---|---|---|---|---|---|
| | | | Ungelled Substance | Plateout | Stickiness (minutes, 1.0 phr) | Roll Lubricating Property | | | |
| | | | | | | 0.3 phr | 0.5 phr | 1.0 phr | |
| Example 9 Comparative Example 10 | " | polymer of Comparative Example 1 | slight | slight | 5 | — | 0.6 | 1.6 | B |
| Comparative Example 11 | " | polymer of Comparative Example 4 | slight | slight | 6 | — | 0.8 | 1.8 | B |
| Comparative Example 12 | styrene polymer resin | (not added) | considerable | considerable | 7 | — | 0.8 | 1.8 | B |

We claim:

1. A lubricant for thermoplastic resins, which is prepared by (A) polymerizing 60 to 100% by weight of an aromatic vinyl monomer and 0 to 40% by weight of other vinyl monomer or monomers copolymerizable therewith to form a polymer, (B) polymerizing 30 to 70 parts by weight of a monomer or monomer mixture comprising 50 to 100% by weight of an acrylic acid ester and 0 to 50% by weight of other vinyl monomer or monomers copolymerizable therewith in the presence of 10 to 60 parts by weight of said polymer wherein when said monomer or monomer mixture is singly polymerized alone, the reduced viscosity $\eta sp/C$ of the resulting polymer is lower than 1.0 as measured at 25° C. with respect to a solution of 0.1 g of the polymer in 100 ml of chloroform, to obtain a polymer, and (C) polymerizing 5 to 30 parts by weight of a methacrylic acid ester in the presence of the two-stage polymer obtained at the stage (A) and (B) so that the total amount of the components (A), (B) and (C) is 100 parts by weight.

2. A thermoplastic resin composition comprising 100 parts by weight of a thermoplastic resin and 0.05 to 10 parts by weight of a lubricant as set forth in claim 1.

3. A thermoplastic resin composition as set forth in claim 2, wherein the thermoplastic resin is a vinyl chloride polymer resin.

4. A thermoplastic resin composition as set forth in claim 2, wherein the thermoplastic resin is an ABS resin.

5. A thermoplastic resin composition as set forth in claim 2, wherein the thermoplastic resin is a styrene polymer resin.

6. A thermoplastic resin composition as set forth in claim 2, wherein the thermoplastic resin is a methacrylate polymer resin.

7. A thermoplastic resin composition as set forth in claim 2, wherein the thermoplastic resin is a polyethylene resin.

8. A lubricant as set forth in claim 1, wherein the reduced viscosity of the polymer formed by polymerizing alone the monomer or monomer mixture (B) is 0.3 to 0.8.

* * * * *